(12) United States Patent
Finn

(10) Patent No.: US 12,103,620 B1
(45) Date of Patent: Oct. 1, 2024

(54) AGRICULTURAL CART

(71) Applicant: Phillip A. Finn, Merritt Island, FL (US)

(72) Inventor: Phillip A. Finn, Merritt Island, FL (US)

(73) Assignee: RANCHWAGONS, L.L.C., Cape Canaveral, FL (US)

( * ) Notice: Subject to any disclaimer, the term of this patent is extended or adjusted under 35 U.S.C. 154(b) by 1105 days.

(21) Appl. No.: 16/376,729

(22) Filed: Apr. 5, 2019

(51) Int. Cl.
 *B62D 63/08* (2006.01)
 *B62D 13/04* (2006.01)
 *B62D 33/02* (2006.01)
 *B62D 33/077* (2006.01)

(52) U.S. Cl.
 CPC .......... *B62D 63/08* (2013.01); *B62D 33/077* (2013.01); *B62D 33/02* (2013.01)

(58) Field of Classification Search
 CPC ...... B62D 63/08; B62D 33/077; B62D 33/02; B62D 13/02; B62D 53/0857; B62D 33/0207; B62D 13/00; B62D 13/04; B62B 3/04; B62B 3/10; B62B 5/0083; B62B 2203/21; B62B 2203/22; B62B 2203/60
 USPC ............................ 410/71; 280/442, 443, 444
 See application file for complete search history.

(56) References Cited

U.S. PATENT DOCUMENTS

| | | | | | |
|---|---|---|---|---|---|
| 1,588,414 A | * | 6/1926 | Harrison | ................... | B62C 1/04 280/137.502 |
| 1,886,722 A | * | 11/1932 | Oppenheim | ........... | B62D 21/14 280/142 |
| 2,059,419 A | * | 11/1936 | Tuft | ...................... | B62D 63/08 280/103 |
| 2,106,923 A | * | 2/1938 | Tuft | ..................... | B62D 63/061 280/80.1 |
| 2,123,456 A | * | 7/1938 | Tuft | ...................... | B62D 63/08 29/446 |
| 2,190,300 A | * | 2/1940 | Van | ...................... | B62D 63/061 280/80.1 |
| 2,450,977 A | * | 10/1948 | McNamara, Jr. | ...... | B62D 21/14 280/142 |
| 2,457,397 A | * | 12/1948 | Richards | .............. | B62D 63/061 280/80.1 |
| 2,495,678 A | * | 1/1950 | Bellinghausen | ....... | B62D 33/08 296/13 |
| 2,562,098 A | * | 7/1951 | Hill | ........................ | B62D 13/04 280/142 |
| 2,603,503 A | * | 7/1952 | Moen | ..................... | B62D 13/04 280/103 |
| 2,640,706 A | * | 6/1953 | Kuster | ................... | B62D 63/08 280/103 |

(Continued)

*Primary Examiner* — Anne Marie M Boehler
(74) *Attorney, Agent, or Firm* — Brian S. Steinberger; Hilary F. Steinberger; Law Offices of Brian S. Steinberger, P.A.

(57) ABSTRACT

Versatile four-wheel towable utility carts, systems, devices and methods for transporting loads for agricultural applications, landscape applications, and the like. The carts can be towed by small and large vehicles, tractors, as well as by tractors, all-terrain vehicles (ATVs), golf carts, and the like. The carts can have an X frame with a steerable front end where the front wheels can be steered by the tow bar. Upwardly extending posts on the frame can have C channel ends that can allow for beams, such as wooden boards to be horizontally supported. The user can add a wood deck platform across the horizontal beams to support various heavy loads.

14 Claims, 16 Drawing Sheets

(56) References Cited

U.S. PATENT DOCUMENTS

| | | | | |
|---|---|---|---|---|
| 3,211,467 A * | 10/1965 | Siddall | B62D 13/04 | 280/103 |
| 3,282,603 A * | 11/1966 | Barth | B62D 63/08 | 280/789 |
| 3,369,823 A * | 2/1968 | Tomen | B62D 13/04 | 280/103 |
| 3,408,089 A * | 10/1968 | Edwards | B62D 13/04 | 280/124.113 |
| 3,455,572 A * | 7/1969 | Wolf | B62D 13/04 | 280/99 |
| 3,695,628 A * | 10/1972 | Fisher | B62D 13/04 | 280/103 |
| 3,704,028 A * | 11/1972 | Greiner | B62D 63/06 | 280/789 |
| 3,929,198 A * | 12/1975 | Dalton | B62D 59/02 | 180/14.2 |
| 4,220,349 A * | 9/1980 | Gaussin | B62D 63/08 | 267/262 |
| 4,339,148 A * | 7/1982 | Smith | B62D 27/06 | 296/35.3 |
| 4,737,055 A * | 4/1988 | Scully | F41H 7/048 | 410/91 |
| 4,804,162 A * | 2/1989 | Rice | F16M 11/046 | 248/129 |
| 4,984,814 A * | 1/1991 | Graffunder | B62B 5/0003 | 280/35 |
| 5,340,142 A * | 8/1994 | Kuhns | B62D 13/04 | 280/89 |
| 5,577,760 A * | 11/1996 | Pressler | B62D 21/20 | 280/124.167 |
| 5,599,031 A * | 2/1997 | Hodges | B62B 5/0083 | 280/35 |
| 5,782,490 A * | 7/1998 | Kendall | B62D 63/08 | 280/789 |
| 6,158,759 A * | 12/2000 | Perry | B62D 13/04 | 280/455.1 |
| D898,623 S * | 10/2020 | Finn | D12/101 | |
| 11,459,045 B1 * | 10/2022 | Hensiek | B62D 65/024 | |
| 2004/0135349 A1 * | 7/2004 | Palmer | B62D 63/061 | 280/656 |
| 2011/0062680 A1 * | 3/2011 | Hellbusch | B62D 13/02 | 280/442 |
| 2013/0207414 A1 * | 8/2013 | Williams | B65D 88/121 | 296/184.1 |
| 2018/0257709 A1 * | 9/2018 | Casali | B62D 21/03 | |
| 2019/0111983 A1 * | 4/2019 | Nordstrom | B62D 63/061 | |
| 2020/0079438 A1 * | 3/2020 | Keen | B62D 24/00 | |
| 2020/0317277 A1 * | 10/2020 | Jansma | F16B 19/02 | |
| 2020/0346700 A1 * | 11/2020 | Nordstrom | B60D 1/06 | |
| 2021/0253179 A1 * | 8/2021 | Gardner | B62D 63/062 | |
| 2021/0276646 A1 * | 9/2021 | Repp | B62D 63/062 | |

* cited by examiner

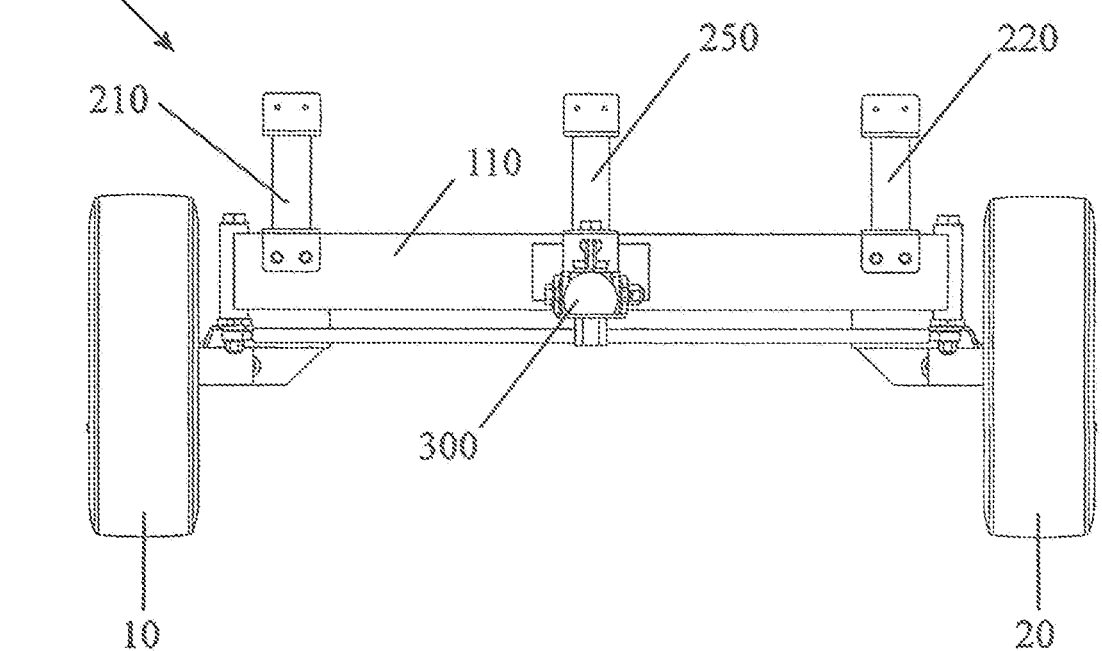
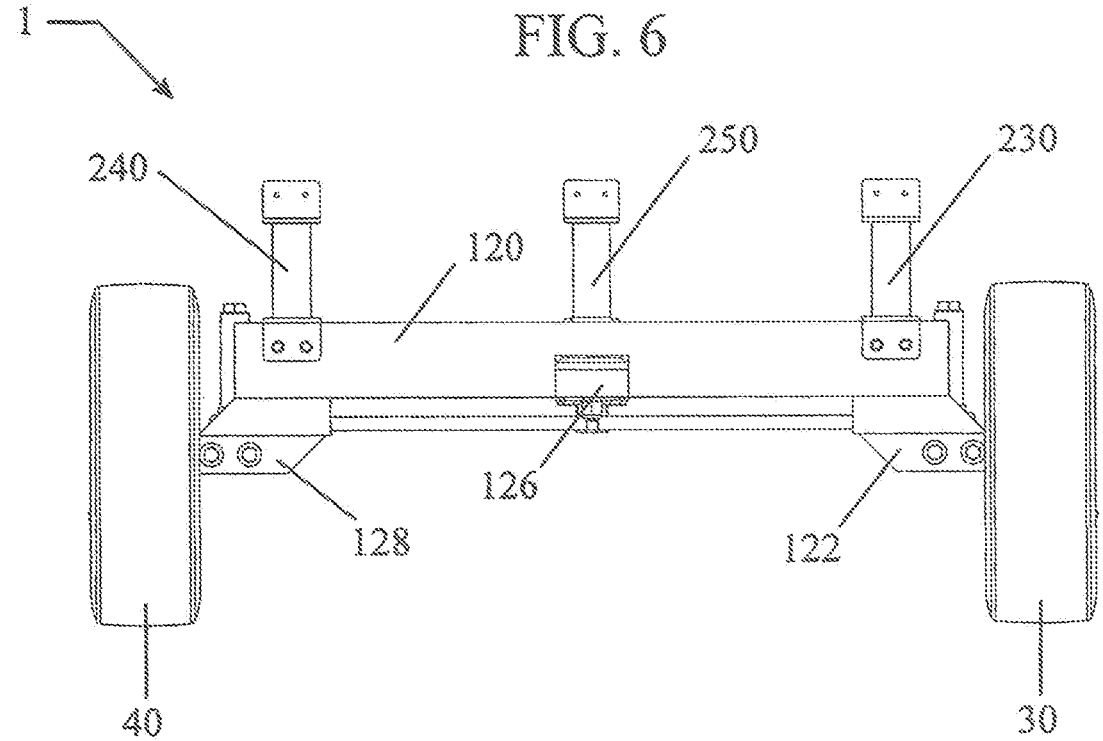

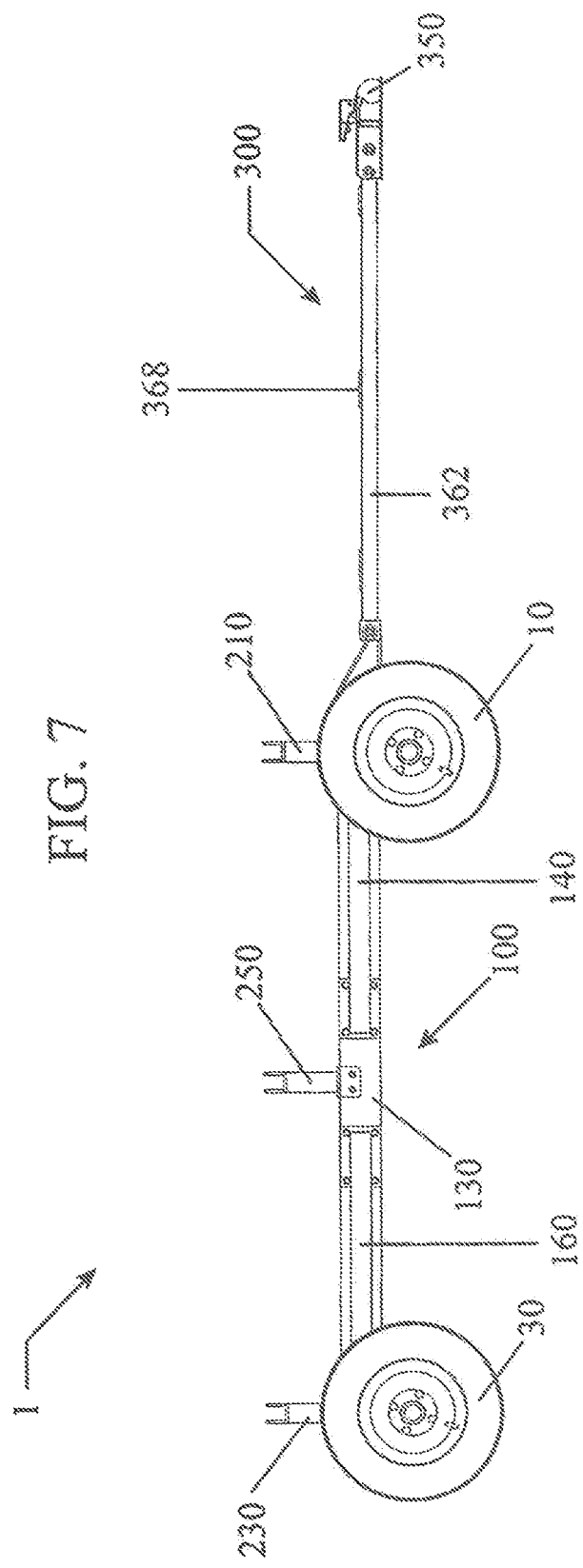
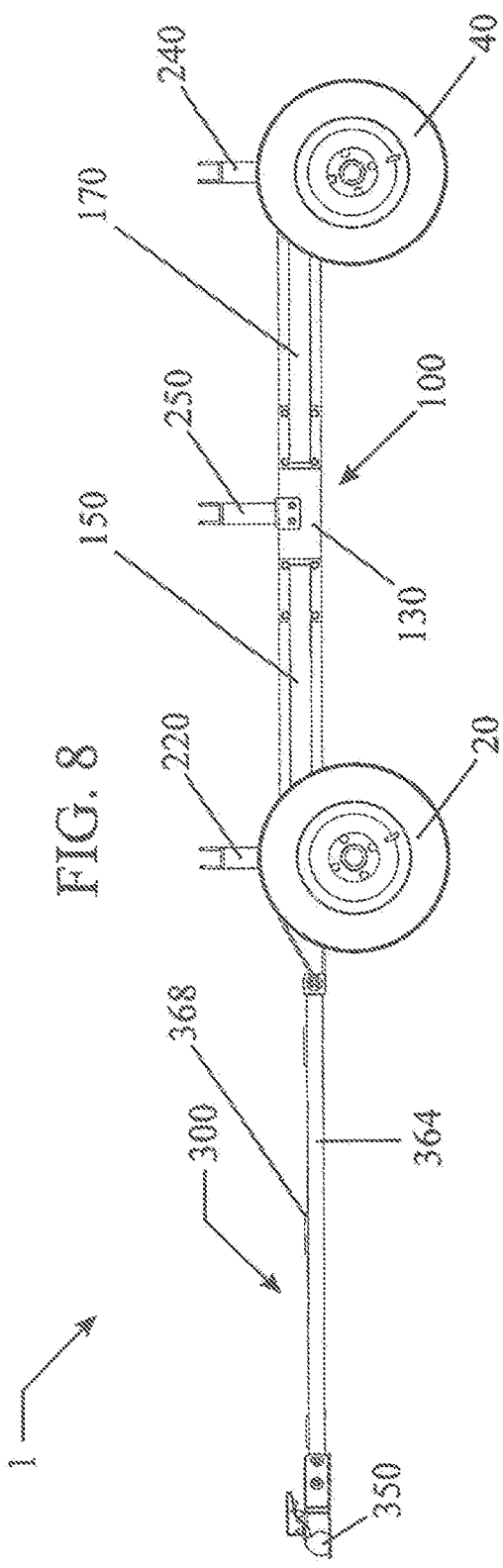

AGRICULTURAL CART

FIELD OF INVENTION

This invention relates to carts, and in particular to versatile four-wheel towable utility carts, systems, devices and methods for use with agricultural applications, which can be towed by small and large vehicles, tractors, as well as by tractors, all-terrain vehicles (ATVs), golf carts, and the like.

BACKGROUND AND PRIOR ART

Utility trailers have generally been limited to two-wheel trailers having a front-end extending tow bar, which needs to be attached to a towing vehicle in order for the trailer to be in a horizontal and not a tilted position.

In addition, the two-wheel utility trailers require full size vehicles, such as trucks and cars in order to be used. As such, the two-wheel utility trailers are difficult to be towed by other vehicles, such as tractors and smaller vehicles, such as golf carts.

Still furthermore, the two wheeled utility trailers are difficult to use with heavy loads, and often require the user having to balance the load above the two wheels in order to be stable. These types of two-wheel trailers are best used when having fitted supports for towing a boat, but not for loose loads.

Additionally, the two wheeled trailers are best used on paved and/or generally flat roads, and are difficult to be towed off road, such as on uneven ground conditions, and the like.

Thus, the need exists for solutions to the above problems with the prior art.

SUMMARY OF THE INVENTION

A primary objective of the present invention is to provide versatile four-wheel towable carts, systems, devices and methods for moving various loads, for agricultural applications, as well as for farmers, ranchers and home owners.

A secondary objective of the present invention is to provide versatile four-wheel towable carts, systems, devices and methods for moving various loads, which can be towed by small and large vehicles.

A third objective of the present invention is to provide versatile four-wheel towable carts, systems, devices and methods for moving various loads, which can be towed by tractors, all-terrain vehicles (ATVs), golf carts, and the like.

A fourth objective of the present invention is to provide versatile four-wheel towable carts, systems, devices and methods for heavy load bearing, that are built from metal, and is light weight and durable and will stand up to extreme conditions.

An embodiment of the towable utility cart, can include a longitudinal frame having front member parallel to a rear member, and a central longitudinal member for attaching the front member to the rear member, a pair of front steerable wheels attached adjacent to outer ends of the front member, a pair of rear wheels attached adjacent to outer ends of the rear member, a plurality of support posts spaced apart from one another, each having a bottom end attached to the frame and a top end, a plurality of support brackets, each extending upward from the top of each of the posts, and a tow bar having an inner end pivotally attached to adjacent to a mid-portion of the front member, and an outer end for being attachable to a tow vehicle, so that the tow bar is swingable to the left and to the right of the front member, and the tow bar is used for steering the front steerable wheels.

The longitudinal frame can be an X shaped frame. The X shaped frame can have a front pair of angled members each having a front end spaced apart from one another and attached to the front member, and each of the front angled members having a rear end attached to the central longitudinal member, and a rear pair of angled members each having a front end attached to the central longitudinal member, each of the rear angled members having a rear end spaced apart from one another and attached to the rear member.

The plurality of posts can include two front posts upwardly extending from the front member and two rear posts upwardly extending from the rear member. The plurality of posts can include a middle post upwardly extending from a middle portion of the X shaped frame. Each of the support brackets on tops of the plurality of posts can include an upward facing C channel. A plurality of horizontal beams having edges that can fit into the upward facing C channels.

The cart can include a tab rearwardly extending from the rear member having a through-hole, for allowing a second towable for allowing an outer end of a tow bar of a second towable utility cart to be attached thereto by at least one of a bolt or a pin.

The cart can include a left rear axle bracket attached to a left underside surface portion of the rear member for allowing one of the rear wheels to be spaced below and away from a left outer end of the rear member and a right rear axle bracket attached to a right underside surface portion of the rear member for allowing another one of the rear wheels to be spaced below and away from a right outer end of the rear member.

The cart can include a left front axle bracket having an outer end for supporting one of the front wheels thereon, and an inner end perpendicular to and fixed to one end of a left flange, a right front axle bracket having an outer end for supporting another one of the front wheels thereon, and an inner end perpendicular to and fixed to one end of a right flange, and a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar.

The cart can include a steering rod arched bracket attached to the middle portion of the steering rod and a pivot pin for fitting into a space formed by the steering rod arched bracket and attached through the lower portion of the tow bar.

The cart can include a front member arched bracket attached to a front side of the mid portion of the front member, the arched bracket having a vertical opening therethrough, a C shaped bracket attached to the inner end of the tow bar, the C shaped bracket having legs that sandwich about both sides of the arched bracket and a pin for pivotally attaching the C shaped bracket to the arched bracket.

The tow bar can include two arms sandwiched to one another having inner ends spaced apart from one another and having outer ends sandwiched to one another, and at least one plate for attaching the two arms to one another.

Another embodiment of the towable utility cart can include a longitudinal frame having front member parallel to a rear member, and a central longitudinal member for attaching the front member to the rear member, an X shaped frame attached to the front member and the rear member, a pair of front wheels attached adjacent to outer ends of the front member, a pair of rear wheels attached adjacent to outer ends of the rear member, wo front posts upwardly extending from the front member, two rear posts upwardly extending from the rear member, a middle post upwardly extending of the X shaped frame, and a plurality of support brackets, each having an upward facing C channel for supporting at least one horizontal beam thereon.

Another embodiment of the towable utility cart, can include a longitudinal frame having front member parallel to a rear member, and a central longitudinal member for attaching the front member to the rear member, a pair of front wheels attached adjacent to outer ends of the front member, a pair of rear wheels attached adjacent to outer ends of the rear member, a plurality of posts upwardly extending of the X shaped frame, a plurality of support brackets, each having an upward facing C channel for supporting at least one horizontal beam thereon, a left front axle bracket having an outer end for supporting one of the front wheels thereon, and an inner end perpendicular to and fixed to one end of a left flange, a right front axle bracket having an outer end for supporting another one of the front wheels thereon, and an inner end perpendicular to and fixed to one end of a right flange, a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar, a steering rod arched bracket attached to the middle portion of the steering rod, a steering pivot pin for fitting into a space formed by the steering rod arched bracket and attached through the lower portion of the tow bar, a front member arched bracket attached to a front side of the mid portion of the front member, the arched bracket having a vertical opening therethrough; and a C shaped bracket attached to the inner end of the tow bar, the C shaped bracket having.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 5 is a front view of the four-wheel utility cart of FIG. 1A.

FIG. 6 is a rear view of the four-wheel utility cart of FIG. 1A.

FIG. 7 is a left side view of the four-wheel utility cart of FIG. 1A.

FIG. 8 is a right side view of the four-wheel utility cart of FIG. 1A.

DESCRIPTION OF THE PREFERRED EMBODIMENTS

Figure 1A:
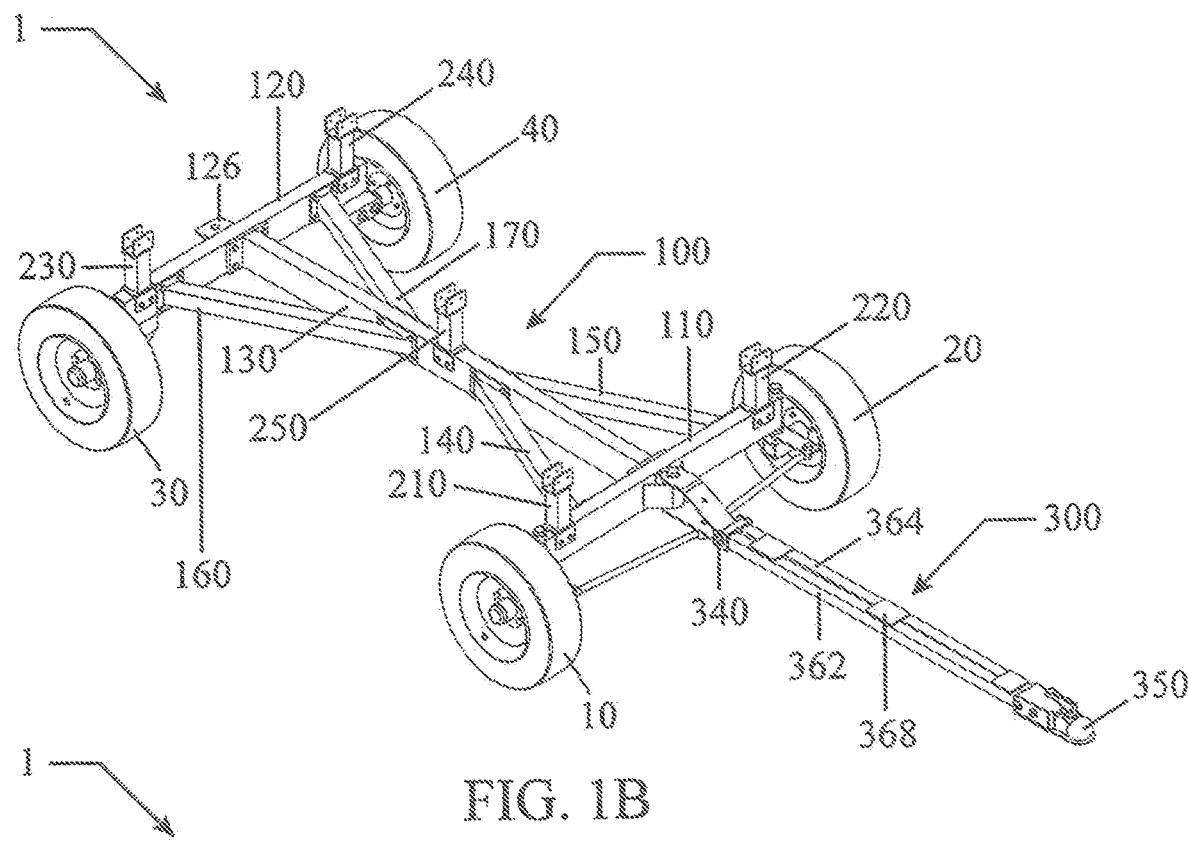
FIG. 1A is an upper front right perspective view of the four-wheel utility cart with the tow bar straight.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 1B:
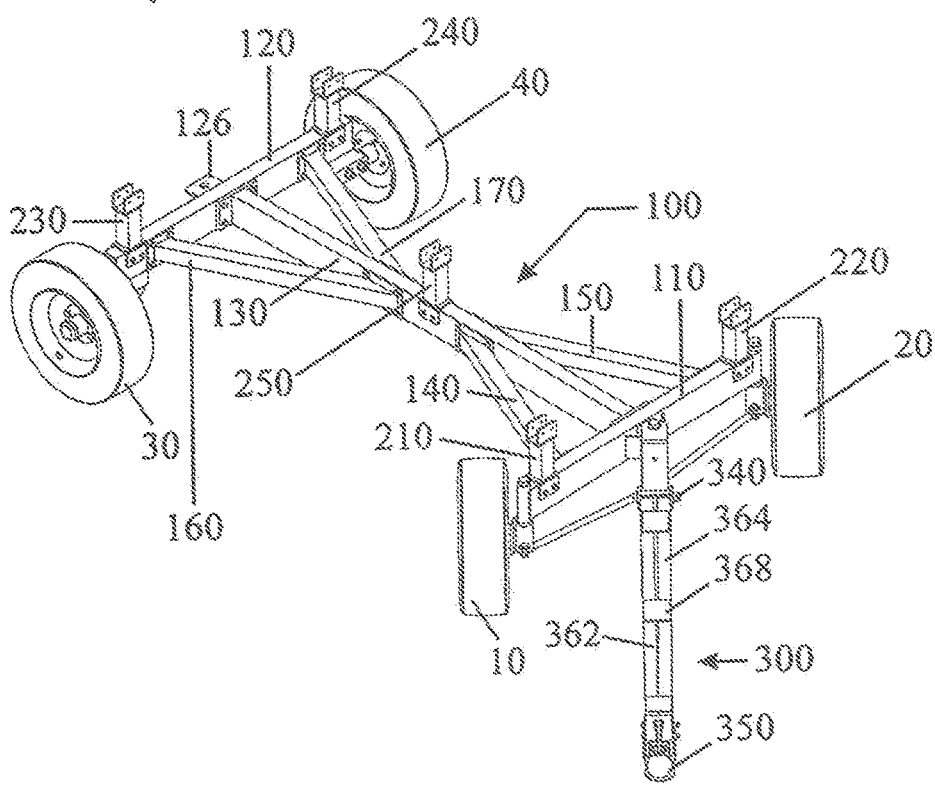
FIG. 1B is another view of the cart of FIG. 1A with the tow bar pivoted to the left.

A list of components will now be described.
1 four-wheel utility cart
10 front left wheel
20 front right wheel
30 rear left wheel
40 rear right wheel
100 X frame
110 front member
112 front left axle flange
113 front left axle bracket
114 left pivot pin for front left axle axle bracket and flange
115 middle pivot bracket (arched bracket) can be welded or fastened in place
116 front right axle flange
117 front right axle bracket
118 right pivot pin for front right axle bracket and flange
120 rear member
122 rear left axle bracket
136 rear extending hitch tab
128 rear right axle bracket
130 central longitudinal member, such as an I beam, and the like
140 front left angle brace member
150 front right angle brace member
160 rear left angle brace member
170 rear right angle brace member
210 front left post
220 front right post
230 rear left post
240 rear right post
250 middle post
252 upward facing support with C channel
254 lower facing support with C channel
300 tow bar
310 C shaped end/C bracket
315 vertical pivot pin for 310 and 115
320 curved/bent steering rod/horizontal swing arm
322 left pivot end of curved/bent steering rod/horizontal swing arm
324 right pivot end of curved/bent steering rod/horizontal swing arm
330 pivot mechanism for middle of curved/bent steering rod/horizontal swing
332 arched bracket on middle of curved/bent steering rod/horizontal swing arm
334 cylinder through arched bracket
335 pivot bolt/pin
340 horizontal pivot pin/hinge allows tow bar to swing up and down
350 outer end of tow bar can include dome end for fitting about tow ball on tow vehicle
362 first arm
364 second arm
368 plate(s) for attaching arms 362, 364 to one another.
400 beams or boards
500 platform attached to the boards FIG. 1A is an upper front right perspective view of the four-wheel utility cart 1 with the tow bar 300 straight. FIG. 1B is another view of the cart 1 of FIG. 1A with the tow bar 300 pivoted to the left.

Figure 2A:
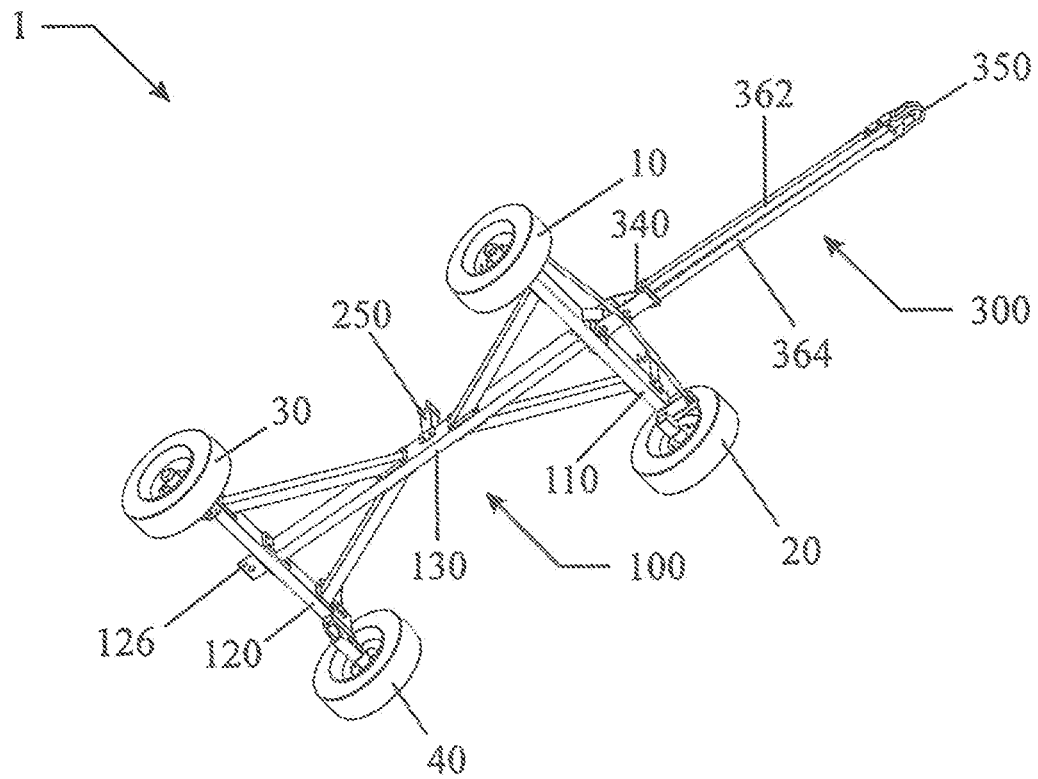
FIG. 2A is a lower front left perspective view of the four-wheel utility cart of FIG. 1A with the tow bar straight.
Figure 2B:
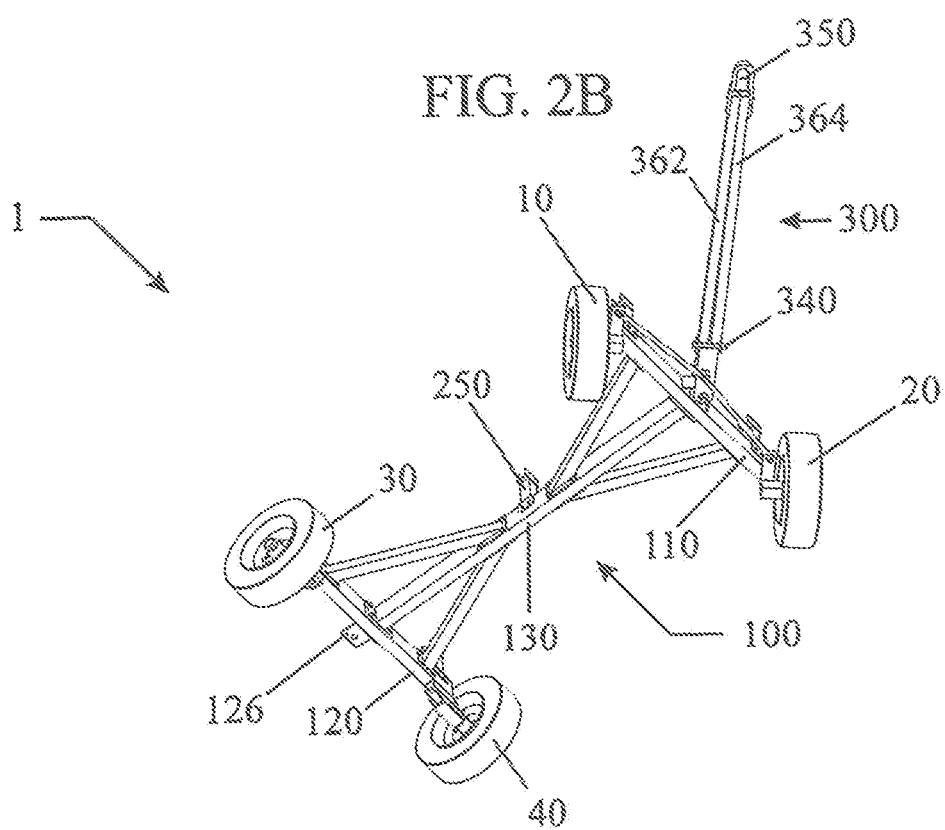
FIG. 2B is a lower front left view of the cart of FIG. 2A with the tow bar pivoted to the left.

FIG. 2A is a lower front left perspective view of the four-wheel utility cart 1 of FIG. 1A with the tow bar 300 straight. FIG. 2B is a lower front left view of the cart 1 of FIG. 2A with the tow bar 300 pivoted to the left.

Figure 3A:
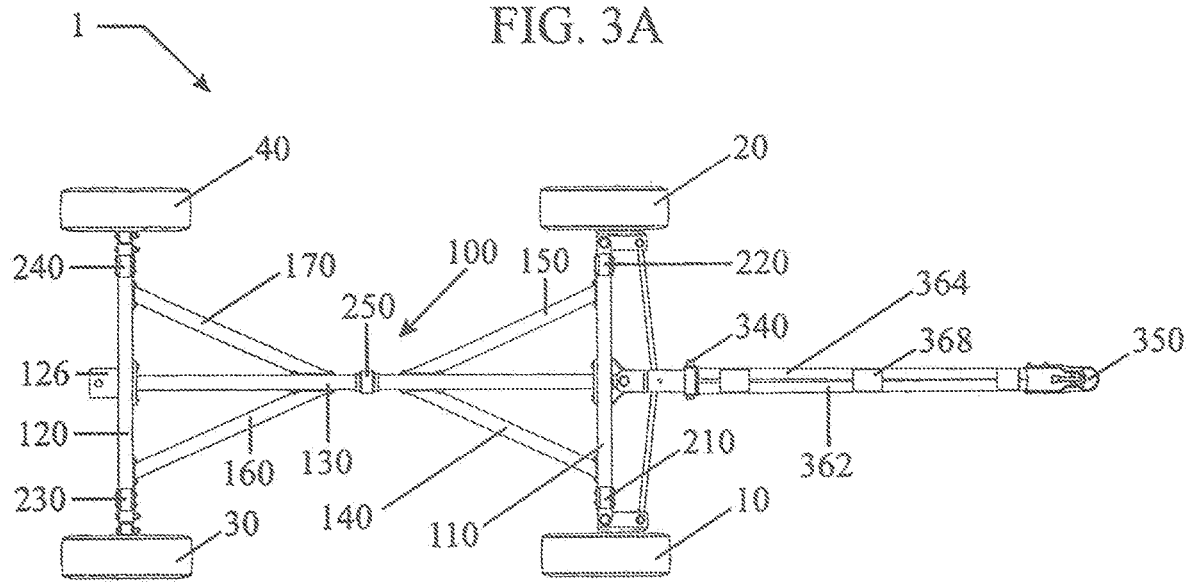
FIG. 3A is a top view of the cart of FIGS. 1A and 2A with the tow bar straight.
Figure 3B:
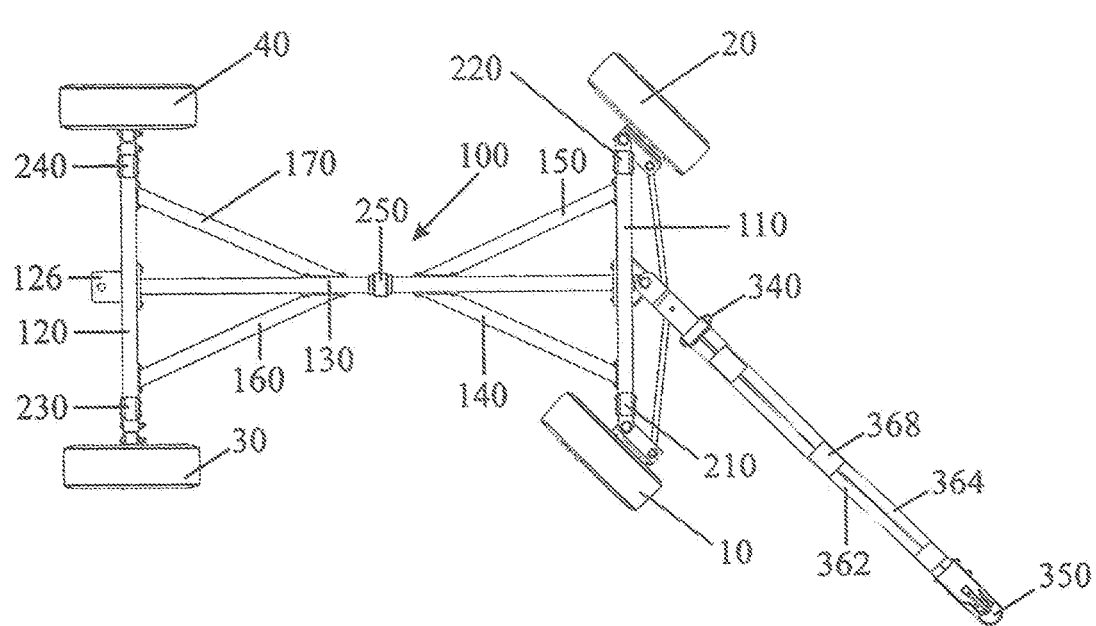
FIG. 3B is another top view of the cart of FIG. 3A with the tow bar pivoted to the left.

FIG. 3A is a top view of the cart 1 of FIGS. 1A and 2A with the tow bar 300 straight. FIG. 3B is another top view of the cart 1 of FIG. 3A with the tow bar 300 pivoted to the left.

Figure 4A:
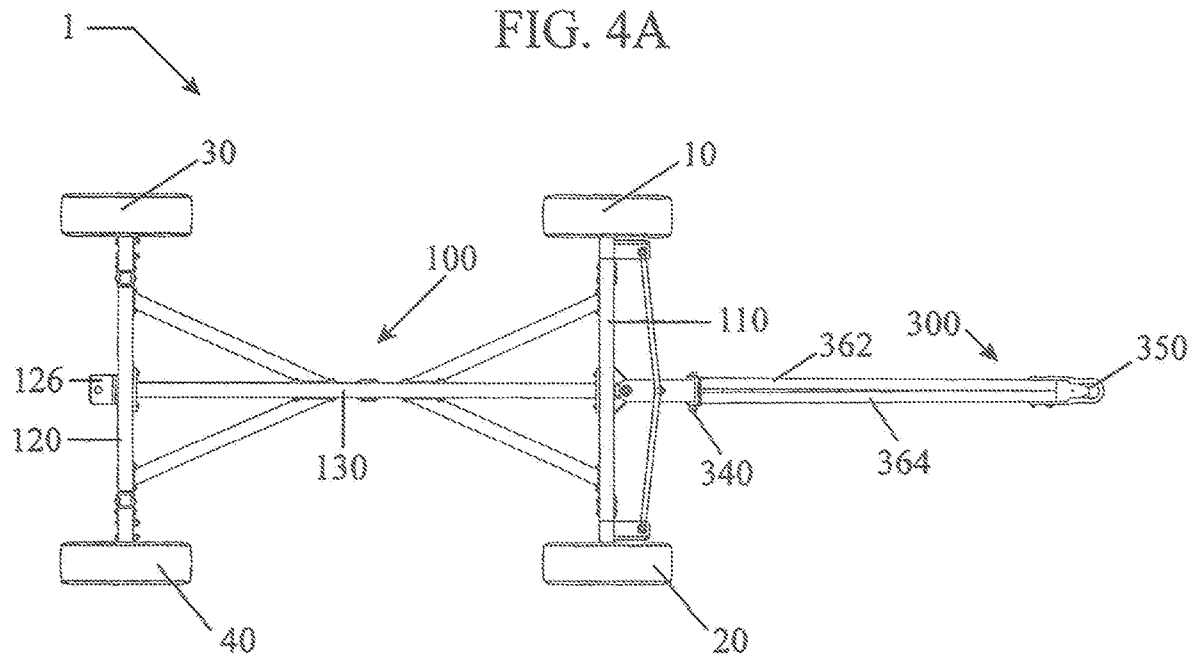
FIG. 4A is a bottom view of the cart of FIGS. 1A and 2A with the tow bar straight.
Figure 4B:
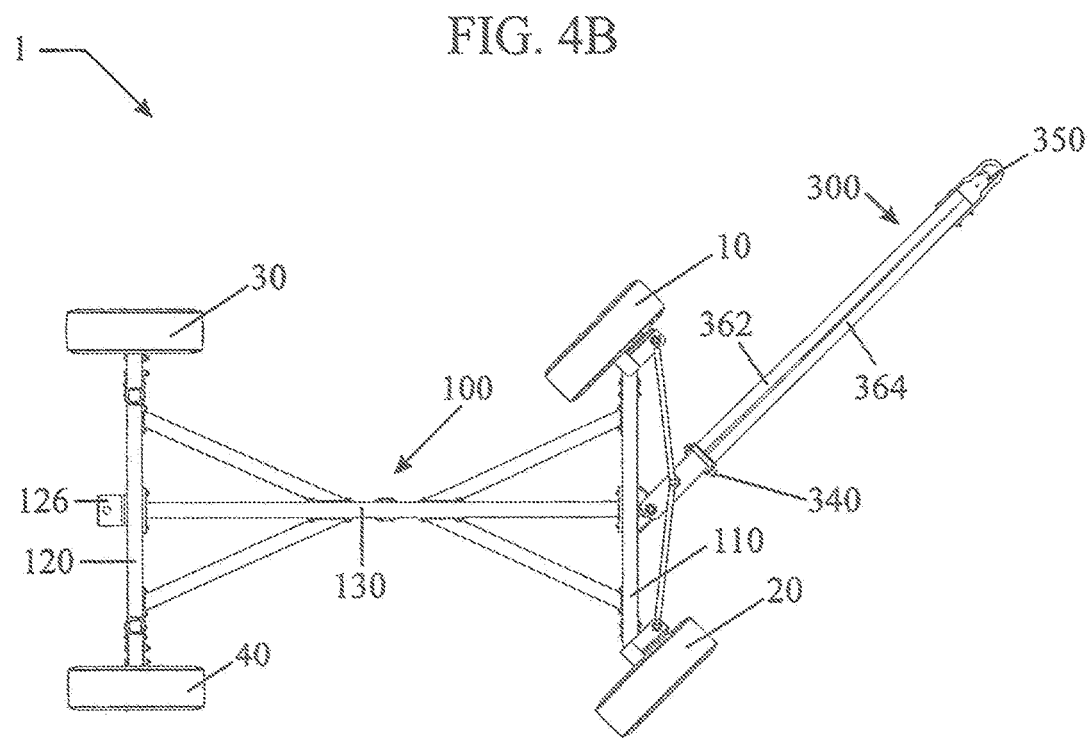
FIG. 4B is another bottom view of the cart of FIG. 4A with the tow bar pivoted to one side.

FIG. 4A is a bottom view of the cart 1 of FIGS. 1A and 2A with the tow bar 300 straight. FIG. 4B is another bottom view of the cart 1 of FIG. 4A with the tow bar 300 pivoted to one side.

FIG. 5 is a front view of the four-wheel utility cart 1 of FIG. 1A. FIG. 6 is a rear view of the four-wheel utility cart 1 of FIG. 1A.

FIG. 7 is a left side view of the four-wheel utility cart 1 of FIG. 1A. FIG. 8 is a right side view of the four wheel utility cart 1 of FIG. 1A.

Referring to FIGS. 1A-8, the four-wheel utility cart 1 can include a front member 110 with a front left wheel 10, and front right wheel 30, and a rear member 120 parallel to the front member 110. The rear member 12 can have a rear left wheel 30 and a right rear wheel 40.

The front member 110 can be attached to a rear member 120 by an X frame 100. The X frame 100 can have a central longitudinal member 130 having enlarged flat ends that can be attached to mid portions of the front member 110 and the rear member 120 by bolts, and the like or by being welded to one another.

The X frame 100 can include a front left angle brace member 140 and a front right angle brace member 150 with enlarged flat front ends spaced apart from one another and attached to one side of the front member 110 by bolts, and the like or by being welded to one another. The front left angle brace member 140 and front right angle brace member 150 can have opposite angled enlarged flat ends that can be attached to mid portions of the central longitudinal member 130 by bolts, and the like or by being welded to one another.

The X frame 100 can include a rear left angle brace member 160 and a rear right angle brace member 170 with enlarged angled flat front ends attached to another mid portion of the central longitudinal member 130 by bolts, and the like or by being welded to one another. The rear left angle brace member 160 and a rear right angle brace member 170 can have opposite enlarged flat ends spaced apart from one another and attached to the rear member 120 by bolts, and the like or by being welded to one another.

Extending upward from the X frame 300 can be a plurality of posts 210, 220, 230, 240 and 250 for supporting beams and platforms, which will be described in greater detail later.

Extending rearward from a mid-portion of the rear member 120 can be a hitch tab that can have a through-hole for allowing pins and bolts to attach the utility cart 1 to another tow bar 300 on a second cart 1, so that plural carts can be towed together. The hitch tab 16 can be L shaped and attached to the rear member 120 by fasteners, such as bolts, and the like, as well as being welded to one another.

Extending forward from a mid portion of the front member 110 can be a pivotal tow bar 300. The tow bar 300 can have a first arm 362 and a second arm 364 attached to one another by plate(s) 368 that can be attached to one another by bolts, and the like, as well as being welded to one another. In a preferred embodiment, the arms 362, 364 can be sandwiched together adjacent the outer end 350 and spaced apart at the up and down pivoting point 340. This pivoting point 340 can be a hinge or a pin or a bolt, and the like that will allow the tow bar 300 to swing up and down.

The outer end of the tow bar 300 can include a dome cover 350 that can fit about a towing ball that can be used with the towing vehicle, such as small and large vehicles, tractors, as well as by tractors, all-terrain vehicles (ATVs), golf carts, and the like. Alternatively, the outer end 350 can be a flat plate or pair of plates having a through-hole therethrough and be used with a similar towing mechanism on a towing vehicle, so that a pivoting mechanism, such as but not limited to a loose bolt or loose pin can allow a pivoting action between the outer end of the tow bar 300 and the vehicle doing the towing.

Figure 9A:
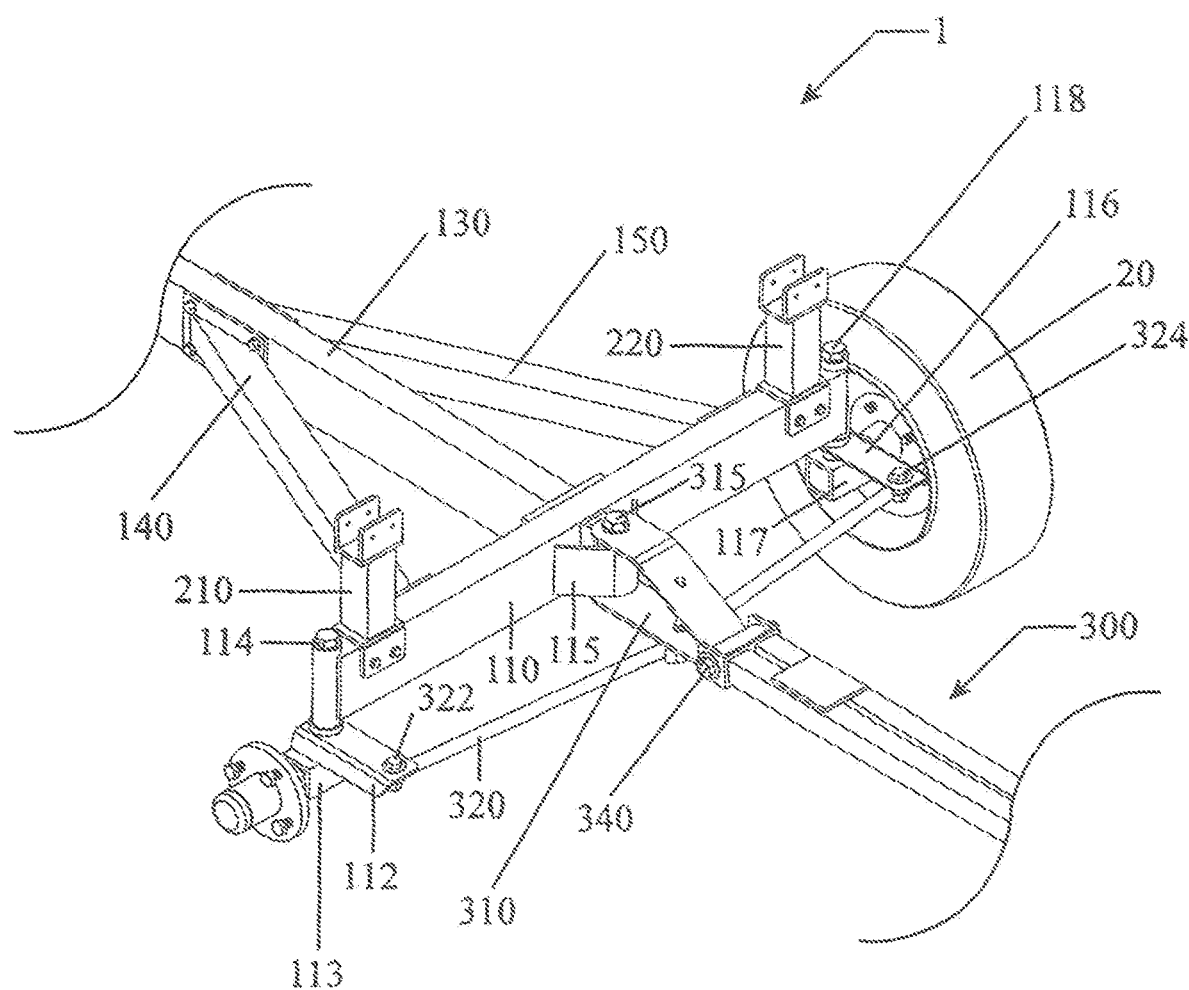
FIG. 9A is an enlarged top perspective view of front of the cart of FIG. 1A with a wheel removed and showing the steering mechanism components.
Figure 9B:
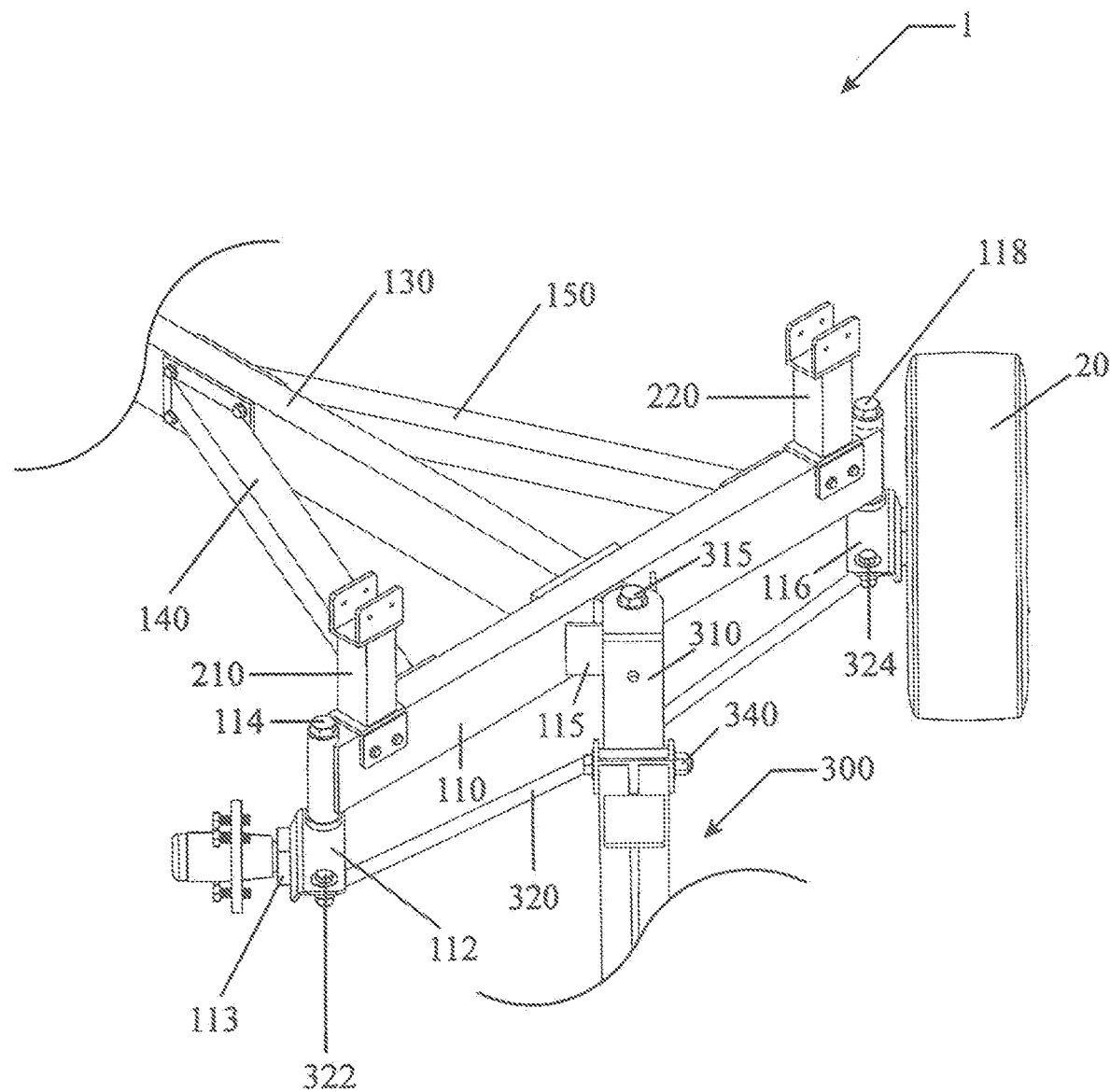
FIG. 9B is another enlarged perspective view of the front of the cart of FIG. 9A with the tow bar pivoted to the left.

FIG. 9A is an enlarged top perspective view of front of the cart 1 of FIG. 1A with a front left wheel 10 removed and showing the steering mechanism components. FIG. 9B is another enlarged perspective view of the front of the cart 1 of FIG. 9A with the tow bar 300 pivoted to the left.

Figure 10A:
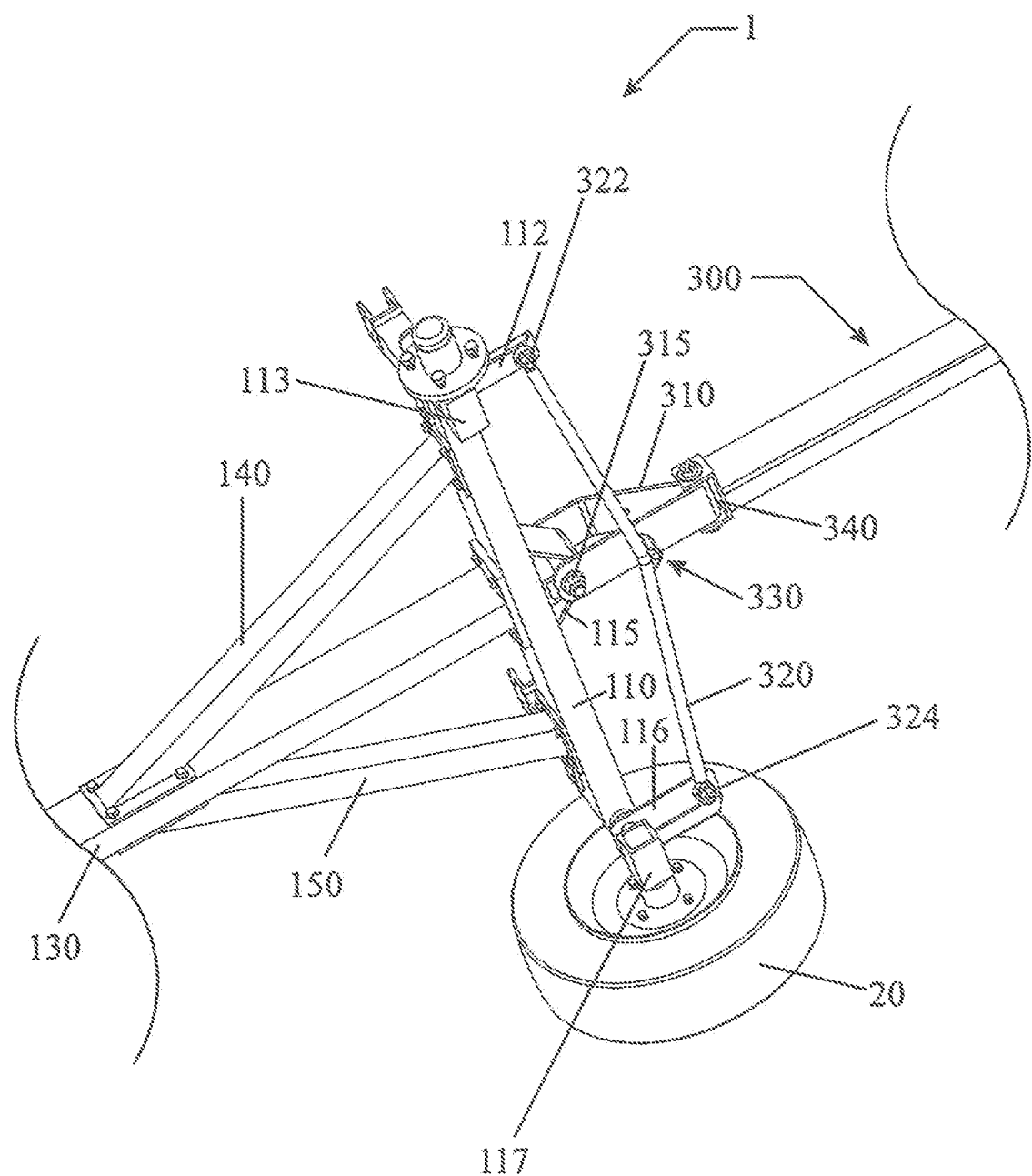
FIG. 10A is an enlarged bottom perspective view of the of the cart of FIG. 2A with a wheel removed and showing the steering mechanism components.
Figure 10B:
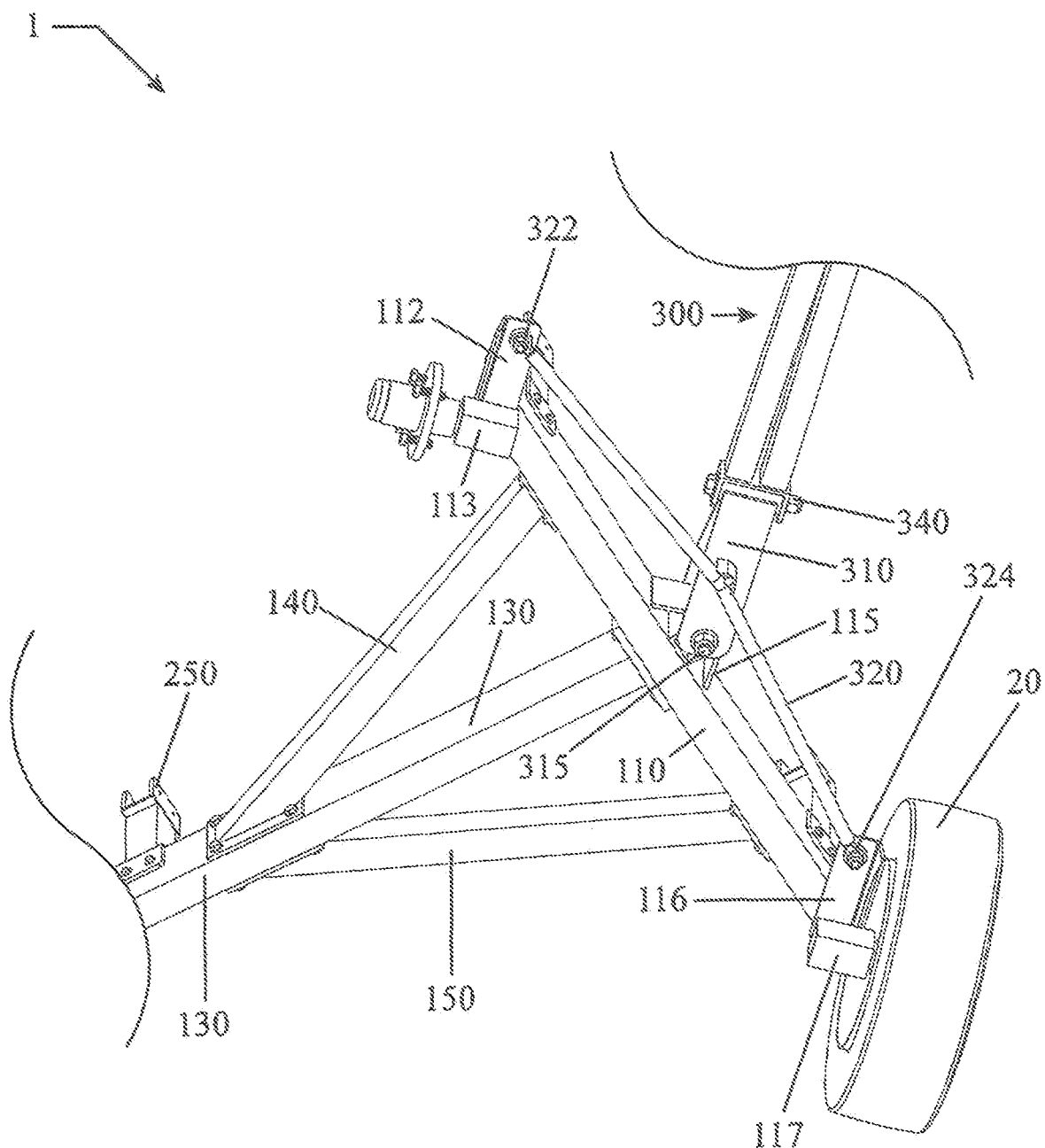
FIG. 10B is another enlarged perspective view of the front of the cart of FIG. 10A with the tow bar pivoted to one side.
Figure 10C:
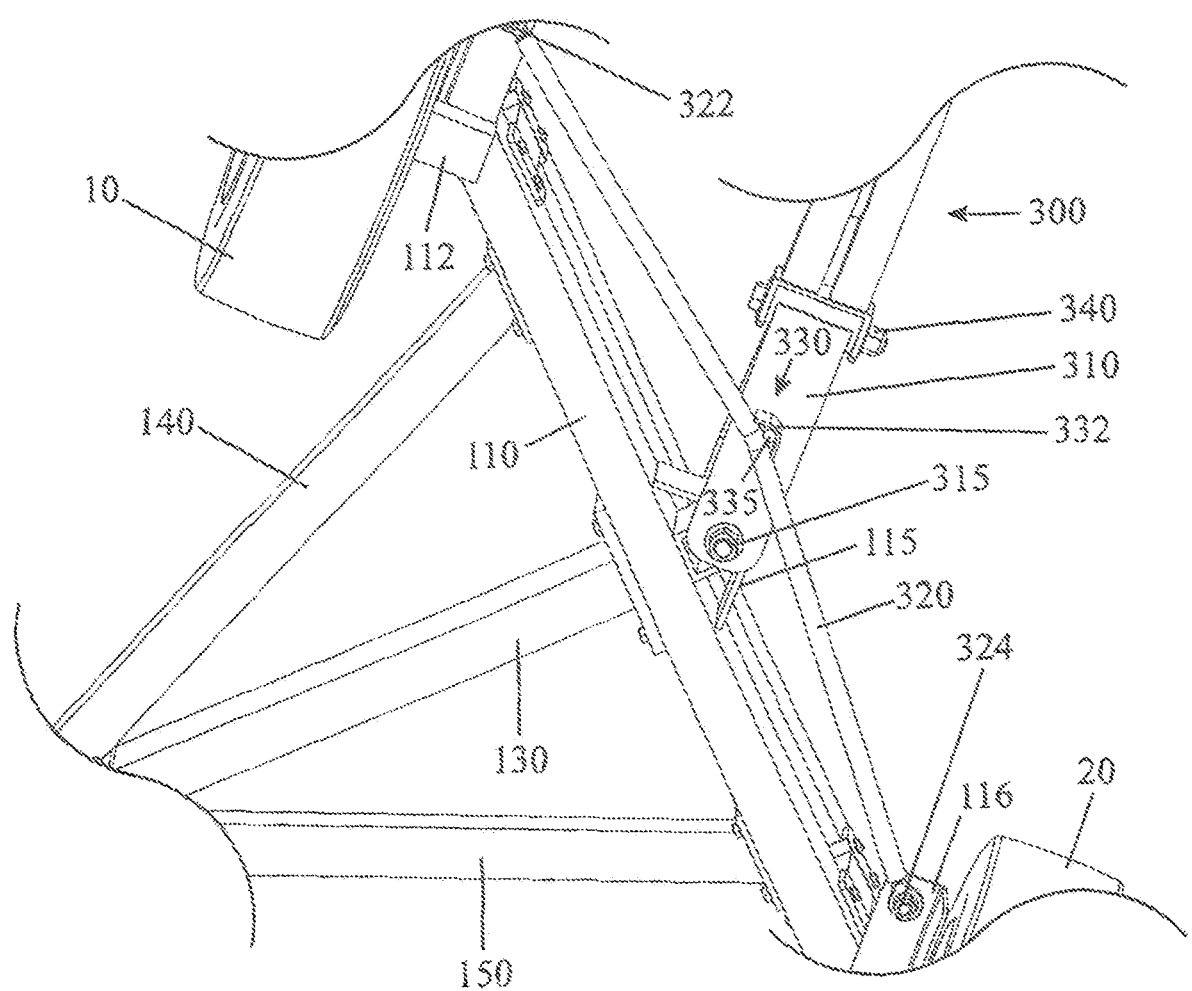
FIG. 10C is still another enlarged perspective view of the steering mechanism and in particular the steering rod of FIG. 10B.
Figure 11:
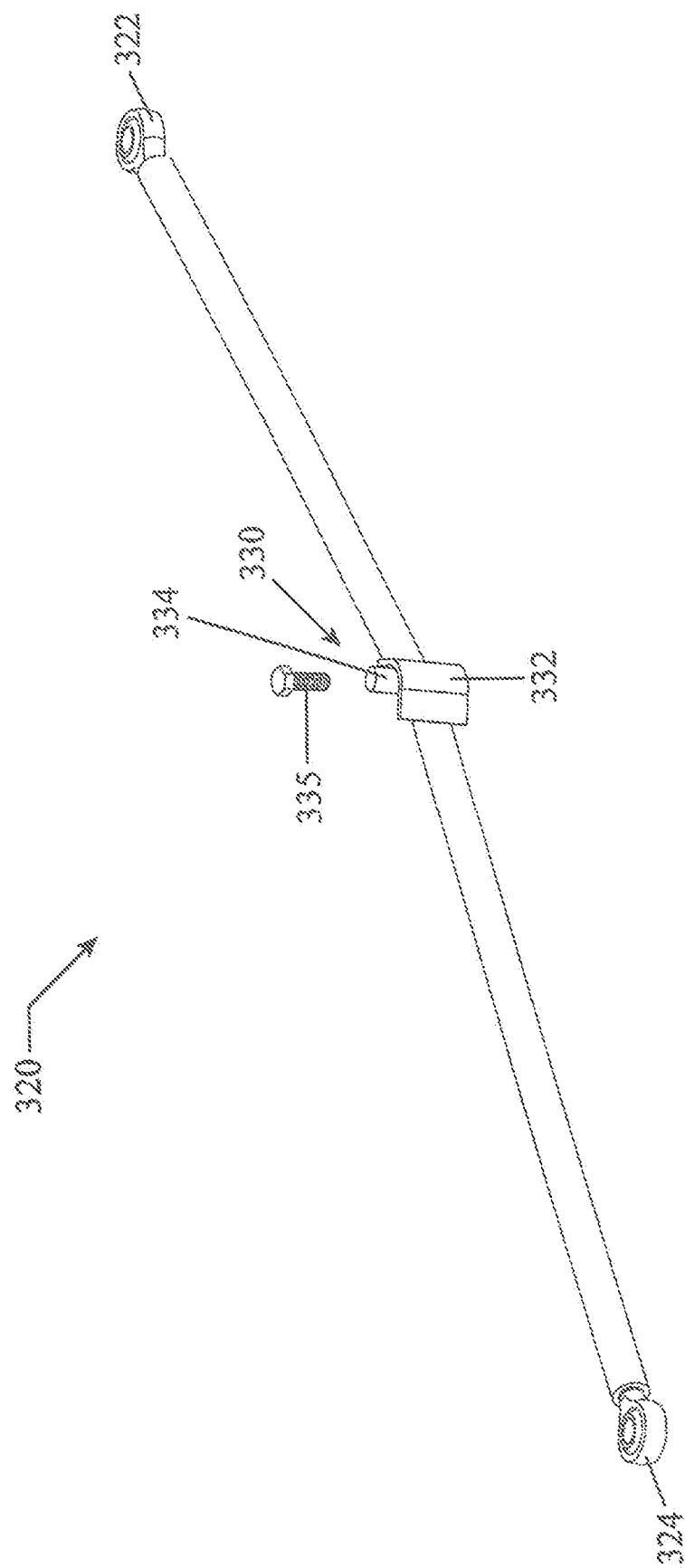
FIG. 11 is a perspective view of the steering rod used in the steering mechanism of the preceding figures.

FIG. 10A is an enlarged bottom perspective view of the of the cart 1 of FIG. 2A with the front wheel 10 removed and showing the steering mechanism components. FIG. 10B is another enlarged perspective view of the front of the cart 1 of FIG. 10A with the tow bar 300 pivoted to one side. FIG. 10C is still another enlarged perspective view of the steering mechanism and in particular the steering rod of FIG. 108. FIG. 11 is a perspective view of the steering rod 320 used in the steering mechanism of the preceding figures.

Referring to FIGS. 1A-4B and 9A-10C, the steerable front end of the cart 1 will now be described. The wheels 10, 20, 30, and 40 can be any type of wheel, such as but not limited to traditional vehicle wheels having inflatable tires, and the like, with the size of the wheel varying depending upon the height of the cart frame 100 desired. As such, traditional wheels can be used, such as those shown and described in U.S. Pat. No. 5,950,754 to Ondrish, Jr. and 5,997,018 to Lee, which are both incorporated by reference in their entirety.

The steerable front end of the cart 1 can includes a front member 110 can have a left pivoting portion that includes a front left axle bracket 113 fixably attached and perpendicular to a front left flange 112. A left pivot member 114, such as a pin or bolt, can allow the left pivoting portion of the combined front left axle bracket 113 fixed with the front left flange 112 to rotate to the left or the right relative to the left end of the front member 110. Similarly, the front member 110 can have a right pivoting portion that includes a front right axle bracket 117 fixably attached and perpendicular to a front right flange 116. A right pivot member 118, such as a pin or bolt, can allow the right pivoting portion of the combined front right axle bracket 117 with the front right flange 116 to rotate to the left or the right relative to the right end of the front member 110.

Referring to FIGS. 9A-10C, the front member 110 can include a middle pivot bracket 115 (arched bracket) that can be attached thereon by bolts or welded in place, and the like. The tow bar 300 can have a C shaped end 310 having through-holes that allows for a vertical pivot pin/bolt 315 for pivotally attaching the tow bar 300 to the front member 110 of the cart 1.

A curved/bent steering rod (horizontal swing arm) 320 can have a left end 322 pivotally attached to an outer end of the left flange 112, and a right end 324 pivotally attached to an outer end of the right flange 116. The pivotal connections can be by bolts, pins, and the like. A middle pivot mechanism 330 can include an arched bracket 332 that can be welded to the middle of the curved/bent steering rod (horizontal swing arm) 320 with a cylinder/tube 334 fixed therethrough. A pivot member 335, such as bolt, pin, and the like can pass through the cylinder/tube 334 and into a lower portion of the C bracket 310 so that swinging the tow bar 300 to the left, allows the curved/bent steering rod (horizontal swing arm) 320 to pivot along with the pivoting caused by pivot bolts/pins 114, 118, 322, 324, respectively and causes the front wheels 10, 20 to turn left causing the cart 1 to steer left. Likewise, swinging the tow bar 300 to the right causes the opposite steering effect.

Figure 12A:
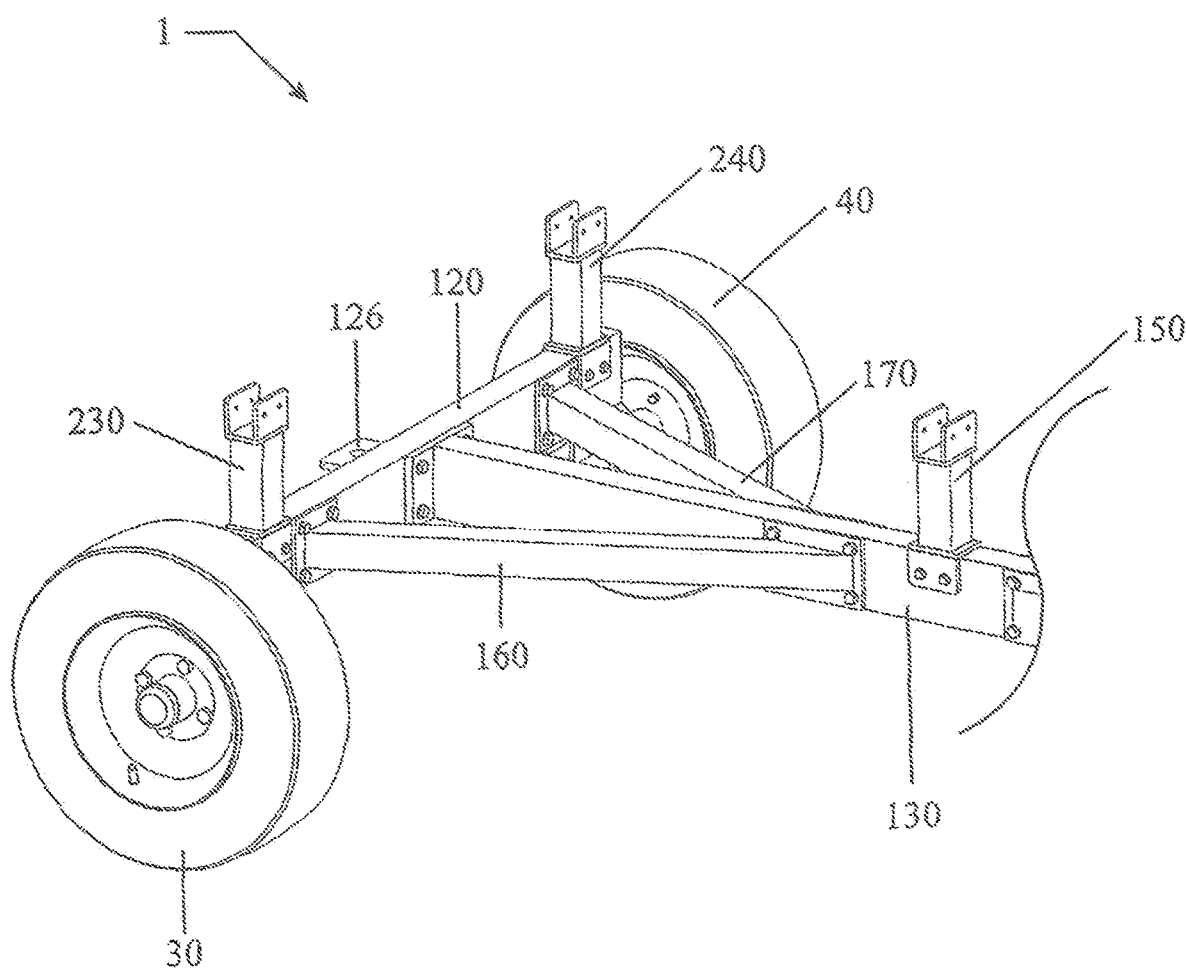
FIG. 12A is an enlarged top perspective view of the rear of the cart of FIG. 1A.
Figure 12B:
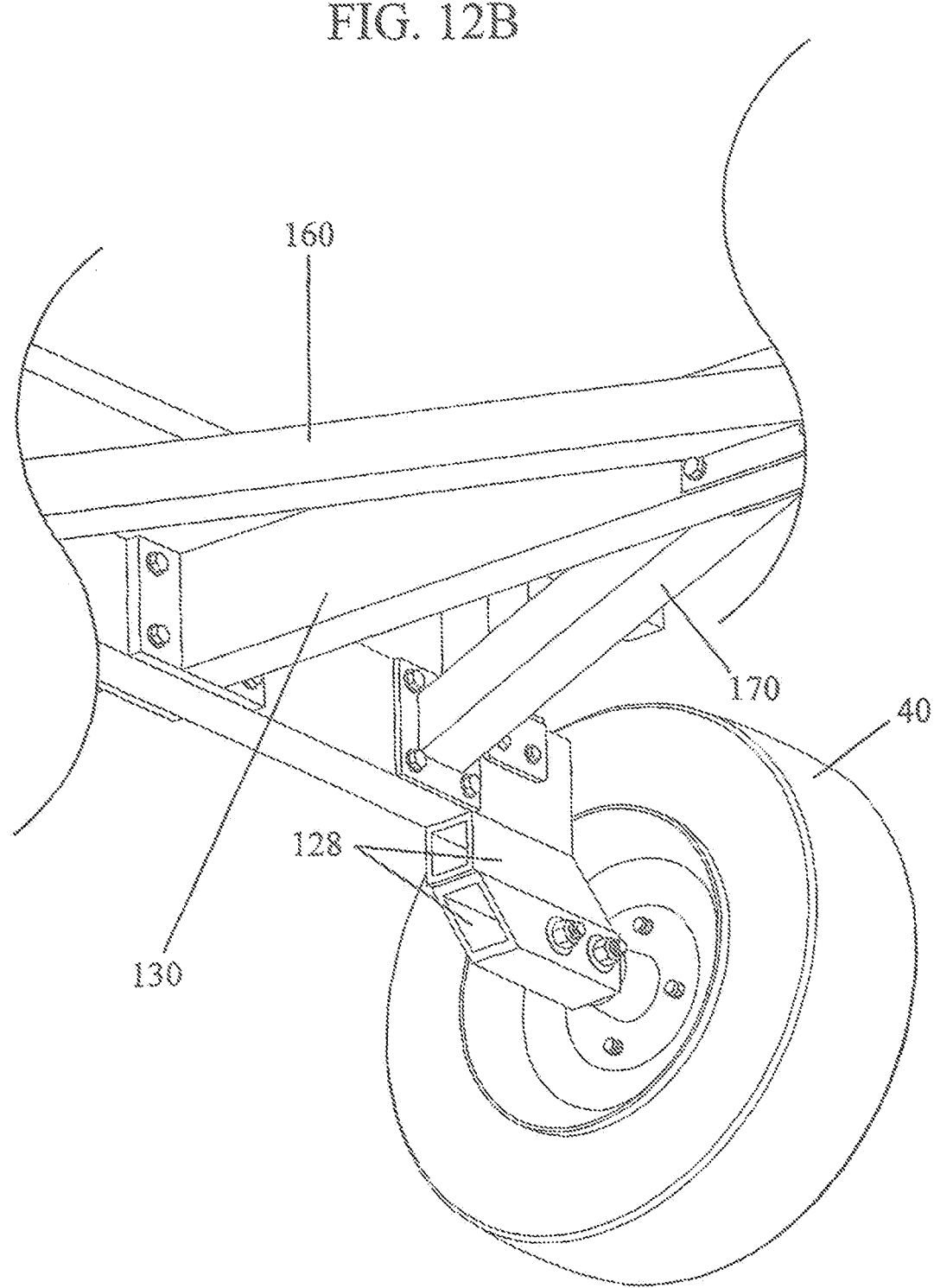
FIG. 12B is still another enlarged perspective view of the rear of the cart of FIG. 1A.

FIG. 12A is an enlarged top perspective view of the rear of the cart 1 of FIG. 1A. FIG. 12B is still another enlarged perspective view of the rear of the cart 1 of FIG. 11A.

Referring to FIGS. 6 and 12A-12B, the rear member can include lower extending rear left axle bracket 122 and rear right axle bracket 128 that each can be attached beneath outer ends of the rear member 120 for allowing the axle portions of the rear wheels 30, 40 to be spaced beneath and offset from the outer ends of the rear member 120. The rear brackets 122, 128 can be made from cut metal tubes that are attached to one another and to wheel hubs and lower surfaces of the rear member 120.

Figure 13:
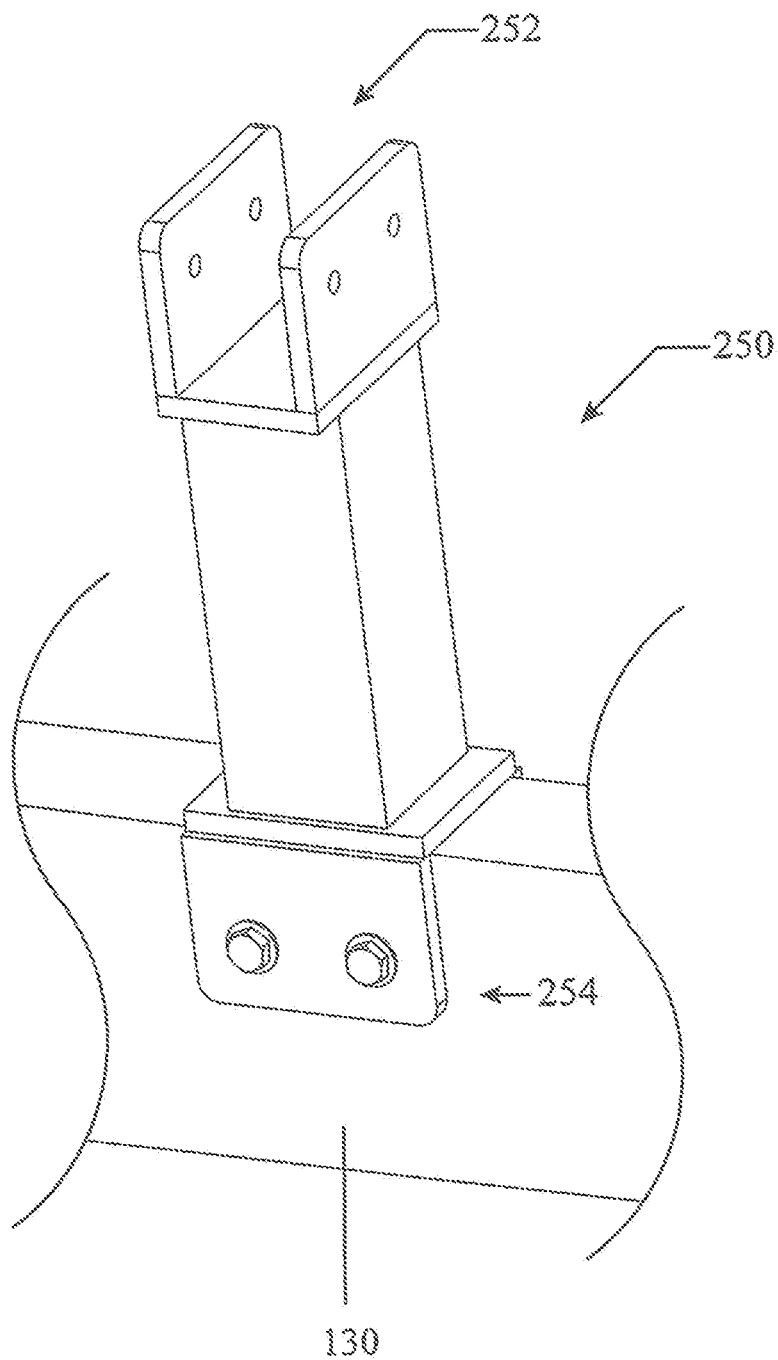
FIG. 13 is an enlarged view of one support post of the four-wheel utility cart of the preceding figures.

FIG. 13 is an enlarged view of one support post 250 of the four-wheel utility cart 1 of the preceding figures. The upwardly extending post 250 can include an upward facing support with a C channel 252, and the bottom end 24 can include an opposite facing C channel that can fit about the top of the central longitudinal member 130. Fasteners, such as but not limited to bolts, and the like can attach the bottom C channel to the top of the longitudinal member 130.

Similarly, the other posts 210, 220, 230, and 240 can have similar top and bottom ends with similar C channels, and be attached to other parts of the X frame 100 such as the front member 110 and the rear member 120 in a similar manner.

Figure 14:
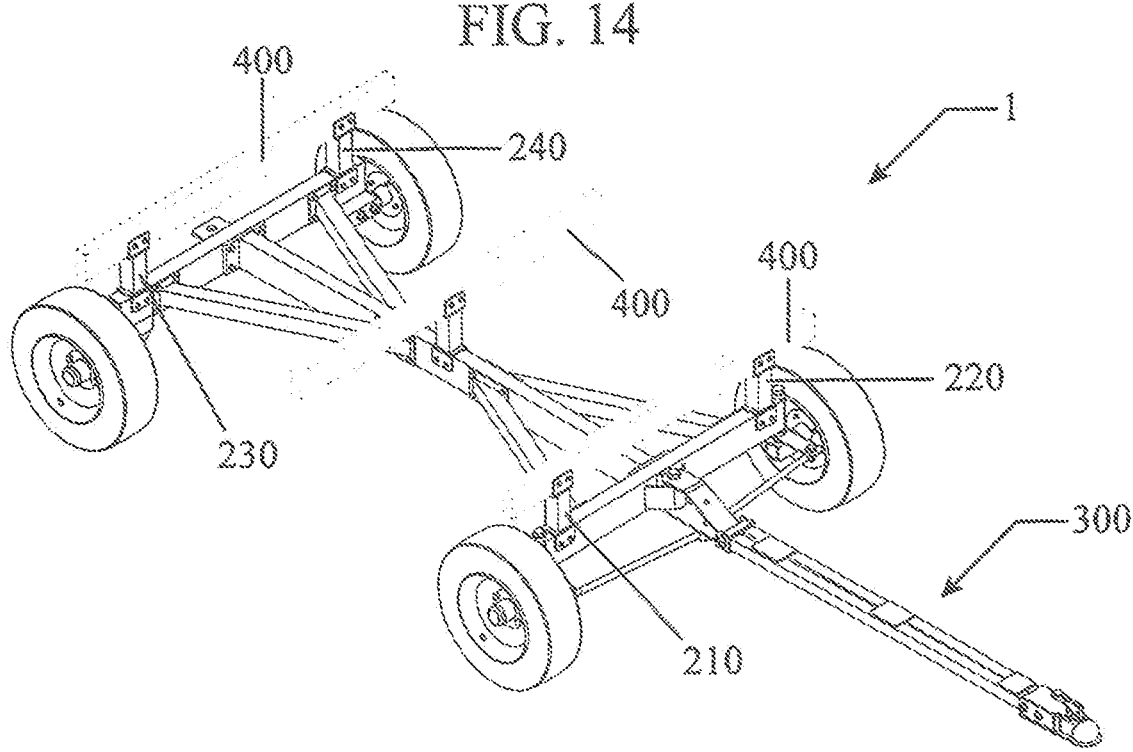
FIG. 14 an upper front right perspective view of the four-wheel utility cart of FIGS. 1A and 13 with beams horizontally mounted in the upright C channels on the posts.

FIG. 14 an upper front right perspective view of the four-wheel utility cart 1 of FIGS. 1A and 13 with beams 400 horizontally mounted in the upright C channels on the posts 210, 220, 230, 240 and 250. The beams 400 can include but are not limited to 2×4s positioned on their narrow width edges into the top of the upwardly facing C channels, and fastened in place by bolts, and the like. In a preferred embodiment three beams 400 can be used in parallel to one another on the posts 210-250.

Figure 15:
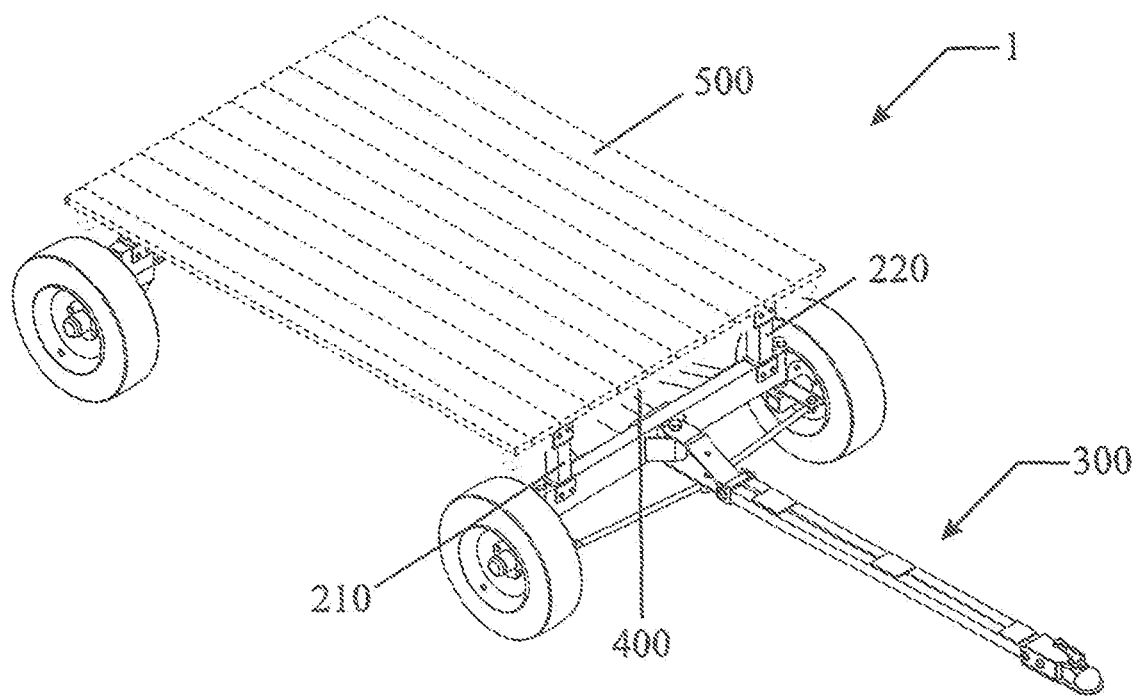
FIG. 15 is another perspective view of the four-wheel utility cart of FIG. 14 with a top deck attached to the horizontal beams.

FIG. 15 is another perspective view of the four-wheel utility cart 1 of FIG. 14 with a top deck 500 attached to the horizontal beams 400. The platform 500 can formed from 2×8 boards laid flat and side by side to one another and attached to the horizontal beams(boards) 400 by fasteners, such as but not limited to screws, nails, and the like.

The novel cart 1 can be of various sizes. For example, one preferred embodiment can have the cart 1 be approximately 5 feet wide by approximately 8 feet long. Other embodiments can have sizes of approximately 10 feet long by approximately 5 feet wide. Another embodiment can be approximately 12 feet long by approximately 5 feet wide.

The novel cart can support different levels of heavy loads. For example, using a spindle axis of 1,000 pounds per wheel, can allow for a load of up to approximately 4,000 load to be supported on the cart. Spindle axles of 1400 pounds, can allow a load of up to approximately 5,600 pounds to be supported by the cart. Still furthermore, spindle axles of 2,000 pounds can allow for a load of up to approximately 8,000 pounds to be supported by the cart 1.

Aluminum square tubing can be preferred based on its' strength and ability to last long in harsh conditions and not rust. Other types of tubing materials, such as round tubing can be used. Additionally, other types of material, such as powder coated metal, painted metal, galvanized metal, and the like, can also be used.

The cart can also be very light. For example, forming the cart members and parts primarily from aluminum square tubing with walls being approximately ⅛" thick can have a cart 1 of less than approximately 100 pounds wheels thereon for a cart 1 having a width of approximately 5 feet wide by approximately 8 feet long.

A preferred embodiment of the cart having dimensions of approximately feet wide by approximately 8 feet long can be initially shipped in a kit form in a box having dimensions of approximately 5%2 feet long by approximately 4%2 inches wide by approximately 4 to approximately 6 inches thick, and weigh less than approximately 60 pounds, without wheels. Assembly of the parts from the box into an assembled cart can be done in approximately 20 to approximately 60 minutes.

While pivot mechanisms such as bolts and pints are shown and described, other types of pivot mechanisms can be used, as interchanging pins for bolts, and vice versa, as well as using hinges in place of bolts and pins.

Although a flat platform 500 is shown, other surfaces, such as concave surfaces, V shaped surfaces, and the like, can be used.

The term "approximately" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A towable utility cart, comprising:
a longitudinal frame having front member parallel to a rear member, and a central longitudinal member for attaching the front member to the rear member;
the longitudinal frame includes an X shaped frame;
a pair of front steerable wheels attached adjacent to outer ends of the front member;
a pair of rear wheels attached adjacent to outer ends of the rear member;
a plurality of support posts spaced apart from one another, each having a bottom end attached to the longitudinal frame and a top end;
a middle post upwardly extending from a middle portion of the X shaped frame;
a plurality of support brackets, each extending upward from the top end of each of the posts;
a plurality of upward facing C-channels on in at least one of the plurality of support posts and the plurality of support brackets;
a tow bar having an inner end pivotally attached to a mid portion of the front member, and an outer end for being attachable to a tow vehicle, so that the tow bar is swingable to the left and to the right of the front member, and the tow bar is used for steering the front steerable wheels.

2. The towable utility cart of claim 1, further comprising:
a front pair of angled members on the X shaped frame, each having a front end spaced apart from one another and attached to the front member, and each of the front angled members having a rear end attached to the central longitudinal member; and
a rear pair of angled members on the X shaped frame, each having a front end attached to the central longitudinal member, each of the rear angled members having a rear end spaced apart from one another and attached to the rear member.

3. The towable utility cart of claim 1, further comprising:
at least one horizontal beam having edges that fit into the upward facing C channels.

4. The towable utility cart of claim 1, further comprising:
a tab rearwardly extending from the rear member having a through-hole, for allowing an outer end of a tow bar of a second towable utility cart to be attached thereto by at least one of a bolt or a pin.

5. The towable utility cart of claim 1, further comprising:
a left rear axle bracket attached to a left underside surface portion of the rear member for allowing one of the rear wheels to be spaced below and away from a left outer end of the rear member; and
a right rear axle bracket attached to a right underside surface portion of the rear member for allowing another one of the rear wheels to be spaced below and away from a right outer end of the rear member.

6. The towable utility cart of claim 1, further comprising:
a left front axle bracket having an outer end for supporting one of the front wheels thereon, and an inner end perpendicular to and fixed to one end of a left flange;
a right front axle bracket having an outer end for supporting another one of the front wheels thereon, and an inner end perpendicular to and fixed to one end of a right flange; and
a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar.

7. A towable utility cart, comprising:
a longitudinal frame having front member parallel to a rear member, and a central longitudinal member for attaching the front member to the rear member;
a pair of front steerable wheels attached adjacent to outer ends of the front member;
a pair of rear wheels attached adjacent to outer ends of the rear member;

a plurality of support posts spaced apart from one another, each having a bottom end attached to the frame and a top end;
a plurality of support brackets, each extending upward from the top end of each of the posts; and
a tow bar having an inner end pivotally attached H to a mid portion of the front member, and an outer end for being attachable to a tow vehicle, so that the tow bar is swingable to the left and to the right of the front member, and the tow bar is used for steering the front steerable wheels, wherein the longitudinal frame includes:
an X shaped frame,
wherein the plurality of posts includes:
two front posts upwardly extending from the front member;
two rear posts upwardly extending from the rear member; and
a middle post upwardly extending from a middle portion of the X shaped frame.

8. The towable utility cart of claim 7, wherein each of the support brackets on the tops of the plurality of posts includes an upward facing C channel.

9. The towable utility cart of claim 8, further comprising:
a plurality of horizontal beams having edges that fit into the upward facing C channels.

10. A towable utility cart, comprising:
a longitudinal frame having front member parallel to a rear member, and a central longitudinal member for attaching the front member to the rear member;
a pair of front steerable wheels attached adjacent to outer ends of the front member;
a pair of rear wheels attached adjacent to outer ends of the rear member;
a plurality of support posts spaced apart from one another, each having a bottom end attached to the frame and a top end;
a plurality of support brackets, each extending upward from the top end of each of the posts; and
a tow bar having an inner end pivotally attached to a mid portion of the front member, and an outer end for being attachable to a tow vehicle, so that the tow bar is swingable to the left and to the right of the front member, and the tow bar is used for steering the front steerable wheels;
a left front axle bracket having an outer end for supporting one of the front wheels thereon, and an inner end perpendicular to and fixed to one end of a left flange;
a right front axle bracket having an outer end for supporting another one of the front wheels thereon, and an inner end perpendicular to and fixed to one end of a right flange; and
a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar;
a steering rod arched bracket attached to the middle portion of the steering rod; and
a pivot pin for fitting into a space formed by the steering rod arched bracket and attached through the lower portion of the tow bar.

11. A towable utility cart, comprising:
a longitudinal frame having front member parallel to a rear member, and a central longitudinal member for attaching the front member to the rear member;
a pair of front steerable wheels attached adjacent to outer ends of the front member;
a pair of rear wheels attached adjacent to outer ends of the rear member;
a plurality of support posts spaced apart from one another, each having a bottom end attached to the frame and a top end;
a plurality of support brackets, each extending upward from the top end of each of the posts; and
a tow bar having an inner end pivotally attached to a mid portion of the front member, and an outer end for being attachable to a tow vehicle, so that the tow bar is swingable to the left and to the right of the front member, and the tow bar is used for steering the front steerable wheels;
a left front axle bracket having an outer end for supporting one of the front wheels thereon, and an inner end perpendicular to and fixed to one end of a left flange;
a right front axle bracket having an outer end for supporting another one of the front wheels thereon, and an inner end perpendicular to and fixed to one end of a right flange; and
a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar;
a front member arched bracket attached to a front side of the mid portion of the front member, the arched bracket having a vertical opening therethrough;
a C shaped bracket attached to the inner end of the tow bar, the C shaped bracket having legs that sandwich about both sides of the arched bracket; and
a pin for pivotally attaching the C shaped bracket to the arched bracket.

12. A towable utility cart, comprising:
a longitudinal frame having a front member parallel to a rear member, and a central longitudinal member for attaching the front member to the rear member, the longitudinal frame includes an X shaped frame;
a pair of front steerable wheels attached adjacent to outer ends of the front member;
a pair of rear wheels attached adjacent to outer ends of the rear member;
a plurality of support posts spaced apart from one another, each having a bottom end attached to the frame and a top end;
wherein the plurality of posts includes:
front posts upwardly extending from the front member;
rear posts upwardly extending from the rear member; and
a middle post upwardly extending from a middle portion of the X shaped frame;
a plurality of support brackets, each extending upward from the top end of each of the posts; and
a tow bar having an inner end pivotally attached to a mid portion of the front member, and an outer end for being attachable to a tow vehicle, so that the tow bar is swingable to the left and to the right of the front member, and the tow bar is used for steering the front steerable wheels;
a left front axle bracket having an outer end for supporting one of the front wheels thereon, and an inner end perpendicular to and fixed to one end of a left flange;

a right front axle bracket having an outer end for supporting another one of the front wheels thereon, and an inner end perpendicular to and fixed to one end of a right flange; and a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar.

13. A towable utility cart, comprising:

a longitudinal frame having front member parallel to a rear member, and a central longitudinal member for attaching the front member to the rear member;

an X shaped frame attached to the front member and the rear member;

a pair of front wheels attached adjacent to outer ends of the front member;

a pair of rear wheels attached adjacent to outer ends of the rear member;

two front posts upwardly extending from the front member;

two rear posts upwardly extending from the rear member;

a middle post upwardly extending from the X shaped frame; and a plurality of support brackets, each having an upward facing C channel for supporting at least one horizontal beam thereon.

14. A towable utility cart, comprising:

a longitudinal frame having front member parallel to a rear member, and a central longitudinal member for attaching the front member to the rear member;

the longitudinal frame includes an X shaped frame;

a pair of front wheels attached adjacent to outer ends of the front member;

a pair of rear wheels attached adjacent to outer ends of the rear member;

a plurality of posts upwardly extending from the X shaped frame;

a plurality of support brackets, each having an upward facing C channel for supporting at least one horizontal beam thereon;

a left front axle bracket having an outer end for supporting one of the front wheels thereon, and an inner end perpendicular to and fixed to one end of a left flange;

a right front axle bracket having an outer end for supporting another one of the front wheels thereon, and an inner end perpendicular to and fixed to one end of a right flange;

a steering rod having a left end pivotally attached to an outer end of the left flange, and a right end pivotally attached to an outer end of the right flange, and a middle portion, wherein the middle portion of the steering rod is pivotally attached to a lower portion of the tow bar spaced apart from the inner end of the tow bar;

a steering rod arched bracket attached to the middle portion of the steering rod;

a steering pivot pin for fitting into a space formed by the steering rod arched bracket and attached through the lower portion of the tow bar;

a front member arched bracket attached to a front side of a mid portion of the front member, the arched bracket having a vertical opening therethrough; and a C shaped bracket attached to the inner end of the tow bar, the C shaped bracket having legs that sandwich both sides of the front member arched bracket.

* * * * *